Figure 1:
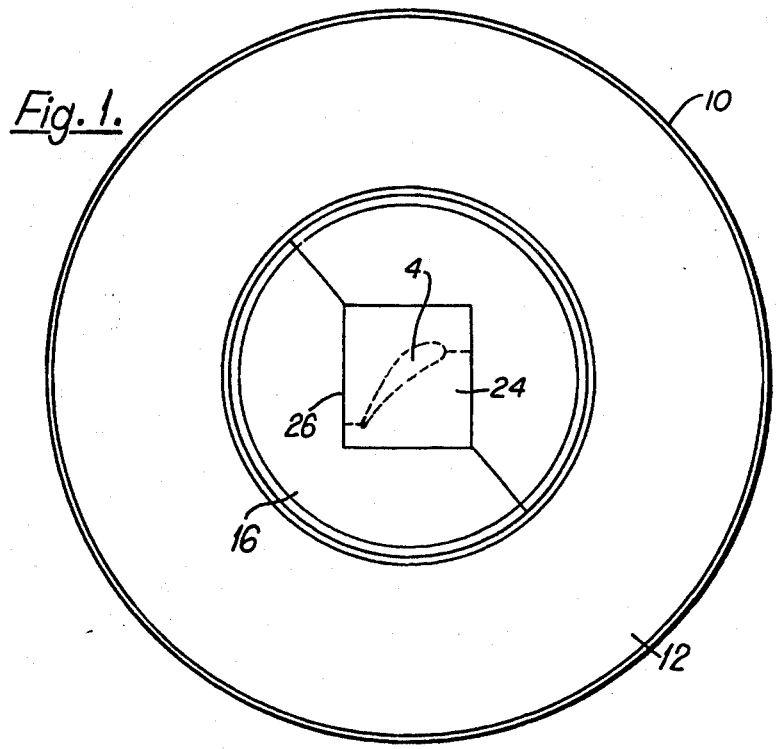

United States Patent [19]
Bird

[11] 3,972,662
[45] Aug. 3, 1976

[54] MOULDING APPARATUS FOR MANUFACTURING BLADED MEMBERS FROM POWDER MATERIAL

[75] Inventor: Jack Raymond Bird, Chellaston, England

[73] Assignee: Rolls-Royce (1971) Limited, London, England

[22] Filed: Nov. 24, 1975

[21] Appl. No.: 634,743

Related U.S. Application Data

[60] Continuation of Ser. No. 483,817, June 27, 1974, abandoned, which is a division of Ser. No. 324,185, Jan. 16, 1973, Pat. No. 3,876,742.

[30] Foreign Application Priority Data
Jan. 19, 1972 United Kingdom................. 2678/72

[52] U.S. Cl................................. 425/78; 425/117; 425/123; 425/127; 425/128; 249/95; 249/96
[51] Int. Cl.² ..................... B29C 6/00; B30B 11/02
[58] Field of Search ............ 425/78, 117, 121, 123, 425/125, 127, 128, 352, DIG. 47; 249/95, 96, 97, 84, 91; 264/332; 29/420.5

[56] References Cited
UNITED STATES PATENTS

| | | | |
|---|---|---|---|
| 1,793,435 | 2/1931 | Bradley............................ | 425/125 X |
| 2,282,328 | 5/1942 | Herrick et al.................... | 425/128 X |
| 3,046,604 | 7/1962 | Graham et al..................... | 249/91 |
| 3,084,391 | 4/1963 | Parstorfer........................ | 249/97 |
| 3,156,011 | 11/1964 | Olson............................... | 425/78 X |
| 3,209,409 | 10/1965 | Grathwohl........................ | 29/33 |
| 3,315,309 | 4/1967 | Braum.............................. | 425/123 |
| 3,391,444 | 7/1968 | Haller.............................. | 29/420.5 |
| 3,452,395 | 7/1969 | Grieger............................ | 425/128 X |
| 3,555,597 | 1/1971 | Meadows.......................... | 425/78 |
| 3,599,291 | 8/1971 | Alexander........................ | 425/121 X |
| 3,659,972 | 5/1972 | Garrett............................ | 425/78 X |

*Primary Examiner*—J. Howard Flint, Jr.
*Attorney, Agent, or Firm*—Cushman, Darby & Cushman

[57] ABSTRACT

The invention is concerned with apparatus for manufacturing gas turbine engine components e.g. guide vanes and blades, in dense silicon nitride starting with silicon nitride in a powder form.

Guide vanes are usually in the form of an aerofoil portion and two shroud portions and according to the invention, the aerofoil portion is made in a first mould by hot pressing a mixture of silicon nitride powder and a fluxing agent, such as magnesia. The formed aerofoil is placed in a second mould so that each end extends partly into a space which is to be filled with a further mixture of silicon nitride powder and a fluxing agent. The further mixtures are hot pressed both to form the shroud portions and to amalgamate the shroud portions with the aerofoil portion.

Features, such as, flanges and webs can be formed in the shrouds during the moulding process or they can be machined into the shrouds after the vane is removed from the second mould.

2 Claims, 4 Drawing Figures

U.S. Patent    Aug. 3, 1976    Sheet 1 of 2    3,972,662

MOULDING APPARATUS FOR MANUFACTURING BLADED MEMBERS FROM POWDER MATERIAL

This is a continuation of application Ser. No. 483,817 filed June 27, 1974, now abandoned, which in turn is a division of Ser. No. 324,185, filed Jan. 16, 1973, now U.S. Pat. No. 3,876,742.

This invention relates to an apparatus for making bladed members from powder material. The invention is particularly though not exclusively concerned with the manufacture of nozzle guide vanes for gas turbine engines in hot pressed dense silicon nitride.

Throughout this specification the term 'hot pressed dense silicon nitride' refers to the method of forming silicon nitride powder as described and claimed in U.K. Pat. No. 970639.

Nozzle guide vanes usually comprise an aerofoil portion, an inner shroud portion and an outer portion and the shroud portions usually differ in thickness from the aerofoil portion. The different thicknesses of the various portions of the vane prevents homogenous densification of the vane during manufacture as a one piece moulding. The thicker portions will not completely densify and cracking may occur due to internal stresses between sections of different density. For instance elastic moduli, thermal conductivity and strength vary directly with changing density.

The present invention seeks to provide an apparatus for making a bladed member, such as a nozzle guide vane which overcomes the above difficulties.

Accordingly, the present invention provides an apparatus for making a bladed member, the member including an aerofoil portion and at least one shroud portion. The bladed member is formed in the present invention by hot pressing a first mixture of silicon nitride powder and a fluxing agent in a suitably shaped first mould to form the aerofoil portion, placing the formed aerofoil portion in locating means, the aerofoil portion extending partly from one end at least of the locating means, placing the locating means in a second mould, placing a second mixture of silicon nitride powder and a fluxing agent in a suitably shaped portion of the second mould, the aerofoil portion extending into the second powder mixture, hot pressing the second powder mixture to form the shroud portion and simultaneously to amalgamate the shroud portion with the aerofoil portion.

Generally the bladed member will have two shroud portions and the second mould will therefore have two suitably shaped portions in which the two shroud portions can be formed.

The shroud portion or portions can be partly pre-formed by hot pressing parts of the or each shroud beforehand and attaching these pre-formed parts to a plunger which is adapted to compress the second powder mixture.

The pre-formed parts may be formed with fixing means which may include features such as, flanges, webs, dowels and apertures so that completed bladed members can be readily secured within a structure such as a gas turbine engine.

Alternatively, the pre-formed parts can be omitted and the plunger may either have a plain face or may be shaped to produce fixing means as above defined in the completed shroud or shrouds.

Preferably, but not essentially the second powder mixture may be lightly compacted at normal temperature prior to hot pressing.

The invention also provides an apparatus including a mould having locating means for the aerofoil portion, a die adapted to receive the second powder mixture and a plunger adapted to apply pressure to the second powder mixture.

Figure 2:
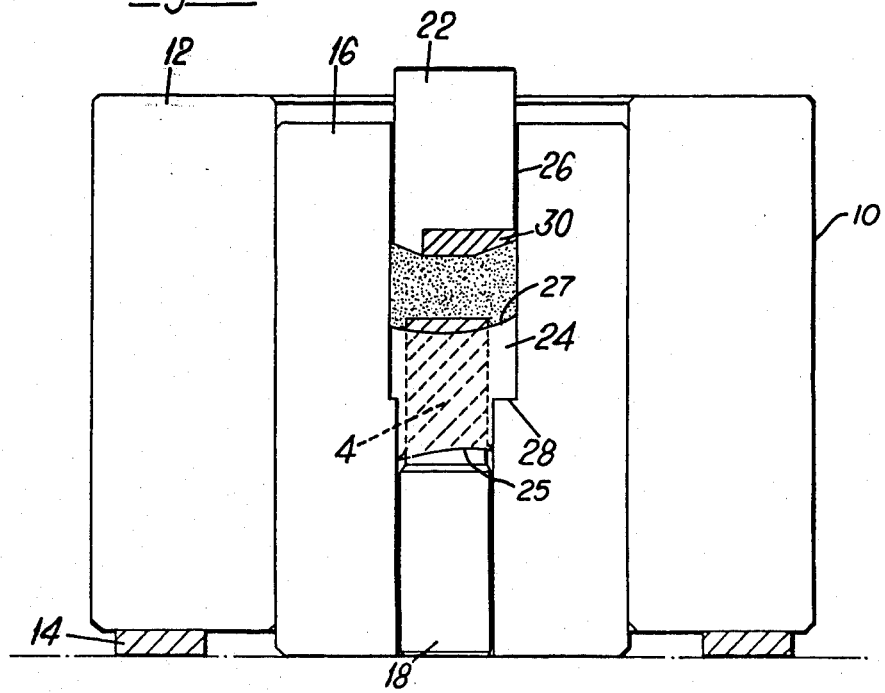
Figure 3:
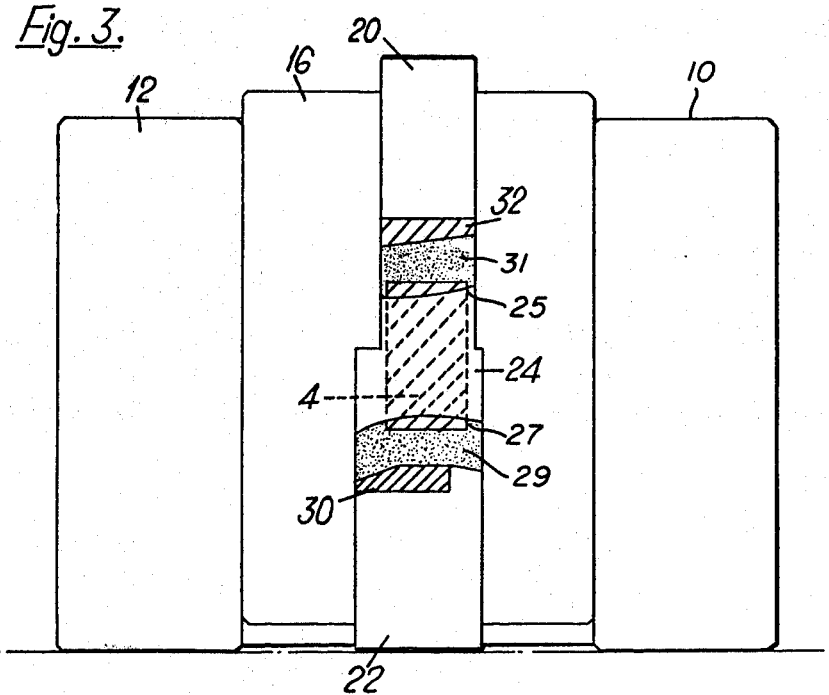
Figure 4:
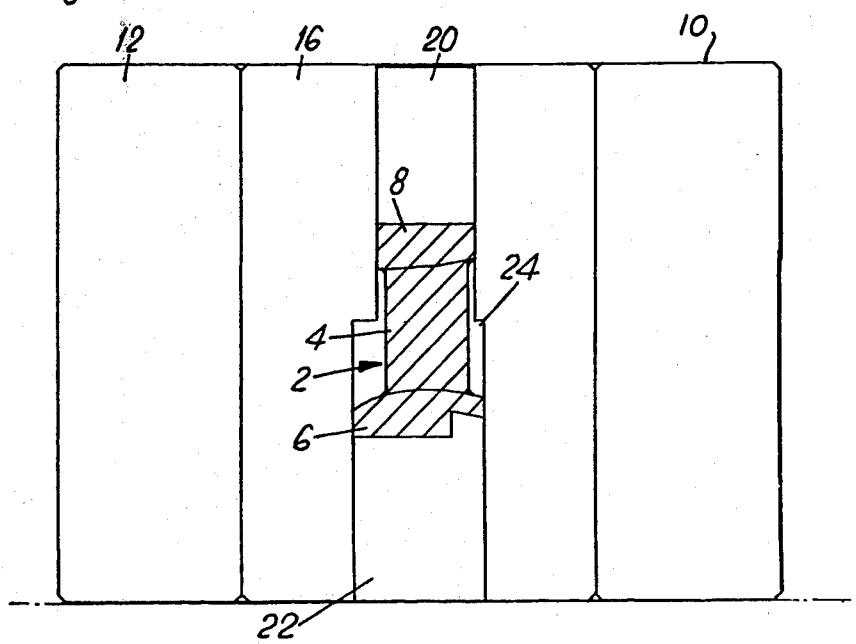

The invention will now be particularly described with reference to the accompanying drawings in which:

FIG. 1 shows a plan view of one form of mould according to the present invention with the cross section of the aerofoil portion of the nozzle guide vane formed thereby illustrated in phantom, FIGS. 2, 3 and 4 are section views taken in side elevation of the mould of FIG. 1 according to the present invention.

The invention will now be initially described with reference to the manufacture of hot pressed dense silicon nitride nozzle guide vanes for use in gas turbine engines.

The nozzle guide vane 2 as shown in FIG. 4 consists of an aerofoil portion 4, a root shroud portion 6 and an outer shroud portion 8.

Referrinfg to the FIGS. generally, a mould 10 consists of a susceptor 12, a packing ring 14 (FIG. 2) on which the susceptor stands, a split die 16, a locating plunger 18 (FIG. 2) an outer shroud plunger 20 (FIG. 3), a root shroud plunger 22 and a split aerofoil die 24.

Referring to FIG. 2 particularly, the aerofoil portion 4 is pre-formed by hot pressing a mixture of silicon nitride powder and magnesium oxide in a suitably shaped die. The pressing is preferably carried out at about 1200 p.s.i. and at a temperature of about 1750°C. This method of forming silicon nitride articles is described in detail in U.K. Pat. No. 970369 and use of the method produces dense, compact silicon nitride articles of almost maximum theoretical density.

The pre-formed portion 4 is placed in the split aerofoil die 24 so that a small portion of the aerofoil extends beyond each end of the die which terminates at its lower end along line 25 as illustrated and at its upper end along line 27. The die is then placed in a rectangular aperture 26 in the die 16 and is located on a shoulder 28, the lower end of the aerofoil resting on the locating plunger 18.

The space above the aerofoil portion 4 is filled with a mixture of silicon nitride powder and magnesium oxide 29 in the ratio 20 to 1 by weight, this powder mixture being eventually to form the root shroud portion 6. The amount of powder mixture used depends on the depth of the formed root shroud which is required. The root shroud plunger 22 has a pre-formed root shroud portion 30 lightly attached to it, the portion 30 being of dense silicon nitride and formed by the method described above. The plunger 22 is placed in the aperture and the powder mixture is lightly compacted at normal temperature.

The mould 10, in the configuration shown in FIG. 3 is placed in a press (not shown) and a pressure of about 1200 p.s.i. is applied at a temperature of about 1750°C. The powder mixtures above 31 and below 29 the aerofoil densify to form the inner and outer shroud portions 6 and 8, respectively. Also the pre-formed portions 30 and 32 amalgamate with the shroud portions 6 and 8 respectively and the aerofoil portion 4 amalgamates with the shroud portions. A section taken through the completed nozzle guide vane shows that there is virtually no change in the structure across the boundaries between the pre-formed portions of the vane and the shroud portions which are formed in the final pressing action.

Various modifications of the preferred embodiments described above are possible within the scope of the present invention. The pre-formed portions of the inner and outer shrouds may be omitted or these pre-formed portions may be formed with fixing means, so that the formed bladed member may be readily attached to the engine structure. Such fixing means typically comprise features such as flanges, webs, apertures and dowels or any combination of these features. Alternatively, the plungers may be formed so that any of these features can be produced on either or both shrouds.

Also the bladed member may be formed with only one of the shroud portions, e.g. the root shroud, in which case, the final configuration of the mould is as shown in FIG. 2.

I claim:

1. An invertible moulding apparatus comprising:
a housing,
a split die contained within said housing,
a split stationary retaining means located on a shoulder of the split die,
at least one pressure applying plunger, and
a locating plunger, the split stationary retaining means being capable of holding a first part of an article within the split die with at least one end of the first part of the article extending into a space within the split die between the split retaining means and the pressure applying plunger, the locating plunger being positioned within the split die to locate the first part of said article within the split die, the moulding apparatus being invertible and the locating plunger being removable and replaceable with a further pressure applying plunger.

2. An invertible moulding apparatus as defined in claim 1 wherein each pressure applying plunger is adapted to receive on its pressure applying face, a second part of an article which is to be formed within the moulding apparatus.

* * * * *